United States Patent
D'Agostino et al.

(10) Patent No.: US 8,658,235 B2
(45) Date of Patent: Feb. 25, 2014

(54) FROZEN CONFECTION

(75) Inventors: Tommaso D'Agostino, Sharnbrook (GB); Angela Louise Lewry, Sharnbrook (GB); Kenneth John Mack, Sharnbrook (GB); Loyd Wix, Sharnbrook (GB)

(73) Assignee: Conopco Inc., Englewood Cliffs, NJ (US)

( * ) Notice: Subject to any disclaimer, the term of this patent is extended or adjusted under 35 U.S.C. 154(b) by 456 days.

(21) Appl. No.: 12/582,928

(22) Filed: Oct. 21, 2009

(65) Prior Publication Data

US 2010/0104725 A1    Apr. 29, 2010

(30) Foreign Application Priority Data

Oct. 24, 2008  (EP) .................................. 08167564
Oct. 24, 2008  (EP) .................................. 08167565

(51) Int. Cl.
| | |
|---|---|
| A23L 3/16 | (2006.01) |
| A23C 3/00 | (2006.01) |
| A23L 3/36 | (2006.01) |
| C12C 7/26 | (2006.01) |
| A23L 1/00 | (2006.01) |
| A23G 3/00 | (2006.01) |
| A23L 1/05 | (2006.01) |

(52) U.S. Cl.
USPC ........... 426/565; 426/521; 426/524; 426/618; 426/658; 426/661

(58) Field of Classification Search
USPC ................................. 426/565, 618
See application file for complete search history.

(56) References Cited

U.S. PATENT DOCUMENTS

| | | | |
|---|---|---|---|
| 2,176,023 A * | 10/1939 | Musher | 426/567 |
| 2,395,061 A | 2/1946 | Musher | |
| 4,908,223 A * | 3/1990 | Murtaugh et al. | 426/565 |
| 5,234,704 A | 8/1993 | Devine | |
| 5,723,162 A | 3/1998 | Whalen et al. | |
| 5,814,363 A | 9/1998 | Kuehner | |
| 6,379,724 B1 | 4/2002 | Best et al. | |
| 6,395,314 B1 | 5/2002 | Whalen et al. | |
| 6,667,068 B2 | 12/2003 | Smith | |
| 2004/0067299 A1 | 4/2004 | Granger | |
| 2006/0078651 A1 | 4/2006 | Esghipour | |
| 2007/0184164 A1 | 8/2007 | Yu et al. | |
| 2008/0038442 A1 | 2/2008 | Peterson et al. | |
| 2008/0050495 A1 | 2/2008 | Vieira et al. | |

FOREIGN PATENT DOCUMENTS

| | | |
|---|---|---|
| EP | 0970614 A1 | 1/2000 |
| GB | 506031 | 5/1939 |
| GB | 529745 | 11/1940 |
| GB | 961398 | 6/1964 |
| GB | 1256290 | 12/1971 |
| WO | WO 2004/112491 A2 | 12/2004 |
| WO | WO 2006/136283 A1 | 12/2006 |
| WO | WO 2007/006383 A2 | 1/2007 |

OTHER PUBLICATIONS

Heavy Cream. Available online at www.webtender.com since Feb. 1, 2001.*
Skim Milk. Available online at www.nutritiondata.self.com since Dec. 21, 2006.*
Overrun Calculations. Available online at www.foodscience.uoguelph.ca since Dec. 20, 2007.*
Omland et al. "The Influence of Particle Type and Size Distribution on Viscosity in a Non-Newtonian Drilling Fluid". Annual Transactions of teh Nordic Rheology Society, vol. 13, 2005.*
LV 12599 A, Jan. 2001 (abstract).
JP 6237697 A2, May 1997 (abstract).
Rice Dream® Vanilla Frozen Dessert, page downloaded from the Internet on Oct. 2, 2008.

* cited by examiner

*Primary Examiner* — Rena Dye
*Assistant Examiner* — Assaf Zilbering
(74) *Attorney, Agent, or Firm* — Michael P. Aronson

(57) ABSTRACT

A frozen confection comprising from 1 to 15 wt % of cereal meal particles having a size of from 0.1 to 1.0 mm and from 5 to 25 wt % of sweeteners is provided. A process for manufacturing the frozen confection is also provided, the process comprising the steps of: preparing a mix comprising water, 1 to 15 wt % of a cereal meal particles having a size of from 0.1 to 1.0 mm, and 5 to 25 wt % of sweeteners; holding the mix at a temperature of at least 70° C. for at least 10 minutes; pasteurizing and optionally homogenising the mix; then freezing and preferably aerating the mix to produce the frozen confection.

11 Claims, No Drawings

FROZEN CONFECTION

TECHNICAL FIELD OF THE INVENTION

The present invention relates to frozen confections such as ice cream. In particular, it relates to frozen confections that contain reduced amounts of refined carbohydrates.

BACKGROUND TO THE INVENTION

In recent years there has been an increasing demand from consumers for frozen confections containing reduced amounts of sugar, for example because of health concerns relating to obesity, and diseases such as type 2 diabetes. Refined carbohydrates such as corn (glucose) syrups, high fructose corn syrups and maltodextrins are often used to replace sucrose in frozen confections. They help to provide sweetness, smooth textures and good melt resistance, whilst also being an economical source of solids. However, refined carbohydrates are easily broken down to dextrose (glucose) in the human digestive system. As a result they are absorbed quickly by the body and hence provide a short, fast release of energy. Hence they also have disadvantages from a nutritional point of view. Thus, there remains a need for frozen confections which have all the textural and physical characteristics of conventional frozen confections, but which are nutritionally improved.

BRIEF DESCRIPTION OF THE INVENTION

We have now found that frozen confections with good texture can be produced by using cereal meal to replace a substantial proportion of the sugars and refined carbohydrates. Accordingly, in a first aspect, the present invention provides a frozen confection comprising from 1 to 15 wt % of cereal meal particles having a size of from 0.1 to 1.0 mm and from 5 to 25 wt % of sweetener.

Preferably the cereal meal is maize meal, wheat meal or a mixture thereof.

Preferably the frozen confection comprises less than 20 wt % sweetener.

Preferably the frozen confection comprises from 1 to 10 wt % protein.

Preferably the frozen confection comprises from 1 to 15 wt % fat.

Preferably the frozen confection comprises less than 0.5 wt % of stabiliser.

Preferably the frozen confection has an overrun of at least 30%.

We have also found that when using a mix comprising cereal meal, the best results are achieved when using a particular manufacturing process. Accordingly, in second aspect, the present invention provides a process for manufacturing a frozen confection, the process comprising the steps of:
 a) preparing a mix comprising water, 1 to 15 wt % of cereal meal particles having a size of from 0.1 to 1.0 mm, and 5 to 25 wt % of sweetener;
 b) holding the mix at a temperature of at least 70° C. for at least 10 minutes;
 c) pasteurising and optionally homogenising the mix; then
 d) freezing and preferably aerating the mix to produce the frozen confection.

DETAILED DESCRIPTION OF THE INVENTION

Unless defined otherwise, all technical and scientific terms used herein have the same meaning as commonly understood by one of ordinary skill in the art (e.g. in frozen confectionery manufacture). Definitions and descriptions of various terms and techniques used in frozen confectionery manufacture are found in Ice Cream, 6$^{th}$ Edition, Robert T. Marshall, H. Douglas Goff and Richard W. Hartel (2003), Kluwer Academic/Plenum Publishers. All percentages, unless otherwise stated, refer to the percentage by weight based on the frozen confection.

The term "frozen confection" means a sweet-tasting fabricated foodstuff intended for consumption in the frozen state (i.e. under conditions wherein the temperature of the foodstuff is less than 0° C., and preferably under conditions wherein the foodstuff comprises significant amounts of ice). Frozen confections include ice cream, sorbet, sherbet, frozen yoghurt, water ice, milk ice and the like. Preferably the frozen confection is an ice cream or a frozen yoghurt.

Frozen confections of the invention contain cereal meal. The term "cereal meal" refers to cereal grains that have been coarsely ground or milled to particle sizes of from about 0.1 to 1.0 mm, preferably about 0.25 to 0.75 mm, such as about 0.5 mm. It therefore does not include flour which is finely ground and may additionally be refined. During the milling process, cereal grains are ground down into the cereal meal particles. The cereal meal particles are much larger than the grains of starch contained within the kernel of the cereal grain. Cereal meal therefore contains undamaged grains of starch that remain intact amongst the matrix of the other tissues of the kernel. Cereal meal may be produced from edible grain crops such as maize (*Zea mays*), wheat (*Triticum*), barley, rice, sorghum, millets, oats, rye, triticale, buckwheat, fonio and quinoa. Preferred cereal meals are commonly known as polenta and grits, which are obtained from maize, and semolina and bulgar wheat, obtained from wheat. Mixtures of different cereal meals may be used. In contrast to refined carbohydrates, cereal meals retain nutrients present in the cereal grain, such as protein, fibre, oils, vitamins and minerals. Moreover, since they are not refined, cereal meals are broken down slowly by the human digestive system, and therefore provide a delayed and sustained release of energy. Cereal meals also have the advantage that they are preferred by consumers as there is a growing awareness of the health benefits of consuming unrefined foods, particularly whole grain cereals.

Without wishing to be bound by theory, it is believed that in frozen confections the cereal meal particles are gel-like and interact with one another to give a good texture. However, because the individual starch polymers are confined by the cellular structure within the cereal meal particles, they are not able to interact with one another and therefore the frozen confections do not become unpalatably thick or gummy. The frozen confections of the invention comprise at least 1 wt % of cereal meal, preferably at least 2 wt % and more preferably at least 5 wt %. However, we have found that an excess of the cereal meal will make the frozen confection unpalatably viscous and difficult to manufacture and therefore the frozen confection of the invention comprises at most 15 wt % of cereal meal, preferably at most 12 wt %, more preferably at most 10 wt %, such as about 8 wt %.

In addition to the cereal meal, the frozen confection comprises from 5 to 25 wt % sweeteners to provide the characteristic sweet taste and freezing point depression in order to control the ice content. Sweeteners include mono- and disaccharide sugars, such as dextrose, fructose, sucrose and lactose; corn syrups, sugar alcohols (also known as polyols or polyhydric alcohols), such as erythritol, arabitol, glycerol, xylitol, sorbitol, mannitol, lactitol, maltitol, hydrogenated starch hydrosylate (HSH)—also known as polyglycitol, isomalt and palatinit. The total sweeteners preferably make up less than 20 wt %, more preferably less than 17 wt %, most preferably less than 15 wt % of the frozen confection. Preferably the sweeteners make up at least 7 wt %, more preferably at least 10 wt % of the frozen confection. When calculating the amount of the sweetener in a frozen confection, the sweeteners present in coatings (e.g. chocolate coating), inclusions (e.g. chocolate drops, toffee chunks), etc. are not taken into account.

Preferably the frozen confection is aerated, i.e. it has an overrun of at least 30%, more preferably at least 50%, most preferably at least 80%. It is preferable that the overrun does not exceed 150%, however, otherwise the confection does not exhibit the cold mouth-feel conventionally associated with frozen confections. More preferably the overrun is less than 120%. Overrun is defined by the following equation:

$$\text{overrun (\%)} = \frac{\text{density of premix} - \text{density of frozen confection}}{\text{density of frozen confection}} \times 100.$$

"Premix" refers to the mix prior to processing (or following de-aeration of a melted frozen confection). Overrun is measured at atmospheric pressure.

The frozen confections may additionally contain protein, such as milk protein or soy protein, preferably in an amount of from 1-10 wt %, more preferably from 2-8 wt %. Preferably, the protein is milk protein. The frozen confections may also contain fat, such as butterfat, coconut oil, palm oil, sunflower oil and the like, preferably in an amount of from 1-15 wt %, more preferably from 2-10 wt %. The frozen confections may also comprise an emulsifier, such as mono- and di-glycerides of saturated or unsaturated fatty acids, lecithin and egg yolk. Preferably the emulsifier is present at a level of 0.05 to 1% by weight of the frozen confection. The frozen confections may include other ingredients typically used in such products, such as colours, flavours, fruit etc.

The cereal meal of the invention provides structural benefits, in particular good body and texture, which allows a reduction in the amount of stabilizer used. Therefore, the frozen confection of the invention preferably comprises less than 0.5 wt % of stabiliser, more preferably less than 0.25 wt %, most preferably no stabiliser. Stabilisers include proteins such as gelatin; plant extrudates such as gum arabic, gum ghatti, gum karaya, gum tragacanth; seed gums such as locust bean gum, guar gum, tara gum; psyyllium seed gum, quince seed gum or tamarind seed gum; konjac mannan; seaweed extracts such as agar, alganates, carrageenan or furcelleran; pectins such as low methoxyl or high methoxyl-type pectins; cellulose derivatives such as sodium carboxymethyl cellulose, microcrystalline cellulose, methyl and methylethyl celluloses, or hydroxylpropyl and hydroxypropylmethyl celluloses; and microbial gums such as dextran, xanthan or β-1,3-glucan.

In order to obtain the best melting and shape retention properties, we have found that the cereal meal should preferably be held at an elevated temperature during the mix process. It is believed that this allows the starch within the cereal meal particles to become hydrated, so that the cereal meal particles become gel-like. Therefore, the frozen confection may be manufactured by means of a process comprising:

a) preparing a mix comprising water, 1 to 15 wt % of cereal meal particles having a size of from 0.1 to 1.0 mm, and 5 to 25 wt % of sweetener;
b) holding the mix at a temperature of at least 70° C. for at least 10 minutes;
c) pasteurising and optionally homogenising the mix; then
d) freezing and preferably aerating the mix to produce the frozen confection.

Preferably the mix is held at a temperature of at least 75° C., more preferably at least 80° C. for at least 10 minutes, preferably at least 12 minutes, most preferably at least 15 minutes. If the cereal meal is not fully hydrated during the mix process, we have found that the high temperatures usually encountered in the pasteurisation step can cause the cereal meal particles to swell and block the manufacturing apparatus.

Preferably the mix is frozen and aerated in an ice cream freezer (scrape surface heat exchanger).

The invention will now be further described by reference to the examples, which are illustrative only and non-limiting.

EXAMPLES

Maize meal (fine grade) was obtained from East End Foods (West Bromwich, B71 4EA, UK). Its particle size distribution was determined using 4 sieves (BS standard) stacked in descending order of mesh size, i.e. 1 mm mesh size at the top; then 0.5 mm; then 0.25 mm; and then 0.125 mm; with a final collecting element at the bottom. Maize meal was added to the top of the sieves which were then shaken, causing the maize meal particles to pass through or be retained by the sieves according to the particle size. Particles smaller than 0.125 mm were collected in the final collecting element. The weight of the maize meal collected by each sieve and the collecting element was then measured. As shown in Table 1, no maize meal particles were larger than 1 mm and only 1% of the maize meal particles were less than 0.125 mm.

TABLE 1

|  | Mesh size of sieve (mm) | | | | |
| --- | --- | --- | --- | --- | --- |
|  | 1 | 0.5 | 0.25 | 0.125 | <0.125 |
| Maize meal collected (wt %) | 0 | 4 | 78 | 16.9 | 1.1 |

Ice creams were prepared using the formulations shown in Tables 2 and 3. Examples 1 to 8 are formulations according to the invention. Comparative example A is a standard ice cream formulation. Comparative example B is a low sugar ice cream formulation, in which some of the sucrose has been replaced by fructose and corn syrup (a refined carbohydrate).

TABLE 2

|  | Example | | | | | | |
| --- | --- | --- | --- | --- | --- | --- | --- |
| Ingredient (wt %) | A | B | 1 | 2 | 3 | 4 | 5 |
| Skim milk powder | 7.4 | 7.4 | 7.4 | 7.4 | 7.4 | 7.4 | 7.4 |
| Coconut oil | 9.0 | 9.0 | 9.0 | 9.0 | 9.0 | 9.0 | 9.0 |
| Maize meal | 0 | 0 | 5.0 | 7.5 | 10.0 | 8.25 | 9.0 |

TABLE 2-continued

|  | Example | | | | | | |
|---|---|---|---|---|---|---|---|
| Ingredient (wt %) | A | B | 1 | 2 | 3 | 4 | 5 |
| 28 DE corn syrup | 0 | 10.0 | 5.0 | 2.5 | 0.0 | 1.75 | 1.0 |
| Sucrose | 20.0 | 5.0 | 5.0 | 5.0 | 5.0 | 5.0 | 5.0 |
| Fructose | 0 | 7.0 | 7.0 | 7.0 | 7.0 | 7.0 | 7.0 |
| Emulsifier | 0.29 | 0.29 | 0.29 | 0.29 | 0.29 | 0.29 | 0.29 |
| Flavour | 0.17 | 0.17 | 0.17 | 0.17 | 0.17 | 0.17 | 0.17 |
| Locust bean gum | 0.15 | 0.15 | 0.15 | 0.15 | 0.15 | 0.07 | 0 |
| Guar gum | 0.063 | 0.063 | 0.063 | 0.063 | 0.063 | 0.031 | 0 |
| Carrageenan | 0.018 | 0.018 | 0.018 | 0.018 | 0.018 | 0.005 | 0 |
| Water | to 100 | to 100 | to 100 | to 100 | to 100 | to 100 | to 100 |

TABLE 3

|  | Example | | |
|---|---|---|---|
| Ingredient (wt %) | 6 | 7 | 8 |
| Skimmed milk powder | 6.2 | 5.53 | 5.53 |
| Whey powder | 2.18 | 2.50 | 2.50 |
| Coconut oil | 10.0 | 10.0 | 0 |
| Palm oil | 0 | 0 | 10.0 |
| Maize meal | 8.0 | 7.0 | 7.0 |
| Maltitol | 10.0 | 10.0 | 10.0 |
| Oligofructose | 6.0 | 6.0 | 6.0 |
| Emulsifier | 0.36 | 0.36 | 0.36 |
| Flavour and colour | 0.28 | 0.32 | 0.32 |
| Locust bean gum | 0.23 | 0 | 0 |
| Guar gum | 0.078 | 0 | 0 |
| Carrageenan | 0.03 | 0 | 0 |
| Water | to 100 | to 100 | to 100 |

28 DE corn (glucose) syrup was C*Dry™ GL 01924, supplied by Cerestar and had a moisture content of 4 wt %. On a dry basis it consisted of 3% glucose, 11% maltose, 16.5% maltotriose and 69.5% higher saccharides. Skim milk powder (SMP) contained 50 wt % lactose, 35 wt % protein and 1 wt % milk fat with the remainder being ash and moisture. The emulsifier was Grinsted Mono-Di HP 60 supplied by Danisco and contained 98 wt % saturated fatty acids. Maltitol was Maltisorb, supplied by Roquette, >99% pure. Oligofructose was Raftilose™ P95, supplied by ORAFTI and had a moisture content of 3 wt %. On a dry basis the Raftilose™ consisted of 95 wt % oligofructose and 5 wt % sugars (consisting of 3% sucrose, 1% fructose and 1% glucose).

For examples 1 to 8, the dry ingredients were mixed with hot water and held at a temperature of 70° C. for 10 minutes in order to hydrate the cereal meal. The holding step was not required for the comparative examples. The mixes were then pasteurized at 83° C. for 20 seconds and cooled. Each mix was frozen and aerated to an overrun of 100% using a standard ice cream freezer operating with an open dasher, a mix flow rate of 150 liters/hour, and an extrusion temperature of about −7° C. Directly from the freezer, the ice cream was filled into cartons, hardened by blast freezing for 2 hours at −30° C. and finally transferred to a −25° C. store.

Examples 1 to 8 were tasted and all found to be perfectly acceptable ice creams in terms of taste and texture, even in the absence of stabiliser (examples 5, 7 and 8). The examples containing higher amounts of maize meal (above 8%) were perceived as being especially thick and resistant to melting in the mouth, with reduced coldness and iciness. This is characteristic of a high quality, indulgent, warm-eating ice cream.

Milk ice lollies according to the invention (examples 9 to 11) were prepared using the formulations shown in Table 4. A comparative example (C) of a conventional milk ice was prepared according to the formulation in Table 5.

TABLE 4

|  | Example | | |
|---|---|---|---|
| Ingredient (wt %) | 9 | 10 | 11 |
| Maize meal | 5.0 | 7.0 | 10.0 |
| Whole milk powder | 9.0 | 9.0 | 9.0 |
| Sucrose | 12.0 | 12.0 | 12.0 |
| Water | to 100 | to 100 | to 100 |

TABLE 5

| Ingredient (wt %) | Example C |
|---|---|
| Liquid sugar (70% total solids) | 17.0 |
| Skimmed milk concentrate | 18.0 |
| 63DE corn syrup | 6.8 |
| Whey Protein | 4.8 |
| Butter oil | 2.6 |
| Emulsifier (E471) | 0.2 |
| Locust bean gum | 0.22 |
| Carrageenan | 0.03 |
| Guar gum | 0.08 |
| Water | to 100 |

For examples 9 to 11, the dry ingredients were mixed with hot water and held at a temperature of 70° C. for 10 minutes in order to hydrate the cereal meal. The holding step was not required for comparative example C. The mixes were then pasteurized at 83° C. for 20 seconds and cooled. Quiescently frozen products were produced by placing the mixes in 70 ml moulds immersed in a brine bath at −40° C. Sticks were inserted when the mix had partially frozen. When the products were fully frozen, they were removed from the moulds and stored at −25° C. Examples 9 to 11 were tasted and found to have taste and texture properties comparable to the conventional milk ice; in particular they were not gummy.

An ice cream containing wheat meal (example 12) was prepared using the formulation shown in Table 6. Standard bulgar wheat was milled and sieved to yield wheat meal wherein no particles had a size greater than 1 mm and less than 1% of particles had a size less than 0.1 mm. The remaining ingredients were the same as example 1 and the ice cream was prepared in the same way.

TABLE 6

| Ingredient (wt %) | Example 12 |
|---|---|
| Skim milk powder | 7.4 |
| Coconut oil | 9.0 |
| Bulgar Wheat | 5.0 |

TABLE 6-continued

| Ingredient (wt %) | Example 12 |
| --- | --- |
| 28 DE corn syrup | 5.0 |
| Sucrose | 5.0 |
| Fructose | 7.0 |
| Emulsifier | 0.29 |
| Flavour | 0.17 |
| Locust bean gum | 0.15 |
| Guar gum | 0.063 |
| Carrageenan | 0.018 |
| Water | to 100 |

The organoleptic properties of the ice cream of example 12 were found to be excellent, and the texture was judged to be even superior to that of examples 1 to 8.

Alternative cereal products having particles larger and smaller than those of cereal meal respectively were investigated. Table 7 shows ice cream formulations containing rolled oats (comparative example D) which are larger than 1 mm in size and maize flour (comparative example E) which are smaller than 0.1 mm. The remaining ingredients were the same as those of example 3.

TABLE 7

| | Example | |
| --- | --- | --- |
| Ingredient (wt %) | D | E |
| Skim milk powder | 7.4 | 7.4 |
| Coconut oil | 9.0 | 9.0 |
| Rolled oats | 10.0 | 0 |
| Maize flour | 0 | 10.0 |
| Sucrose | 5.0 | 5.0 |
| Fructose | 7.0 | 7.0 |
| Emulsifier | 0.29 | 0.29 |
| Flavour | 0.17 | 0.17 |
| Locust bean gum | 0.15 | 0.15 |
| Guar gum | 0.063 | 0.063 |
| Carrageenan | 0.018 | 0.018 |
| Water | to 100 | to 100 |

The mixes were intended to be prepared in the same way prepared in the same way as examples 1 to 8. However, the mixes resulting from examples D and E were very viscous and the pressure in the production lines became too high to process the mixes through the homogeniser/pasteuriser. As a result it was not possible to prepare frozen confections using these cereal products.

The various features and embodiments of the present invention, referred to in individual sections above apply, as appropriate, to other sections, mutatis mutandis. Consequently features specified in one section may be combined with features specified in other sections, as appropriate.

The invention claimed is:

1. A frozen confection comprising from 5 to 10 wt % of cereal meal particles having a size of from 0.1 to 1.0 mm, from 5 to 25 wt % of sweeteners, and fat selected from a group consisting of coconut oil, palm oil and sunflower oil, wherein the cereal meal is maize meal, wheat meal or a mixture thereof, and wherein the frozen confection does not include flour which is finely ground or flour which is finely ground and additionally refined.

2. A frozen confection according to claim 1 comprising from 5 to 8 wt % of cereal meal.

3. A frozen confection according to claim 1 comprising less than 20 wt % of sweeteners.

4. A frozen confection according to claim 3 comprising less than 17 wt % of sweeteners.

5. A frozen confection according to claim 1 comprising from 1 to 10 wt % protein.

6. A frozen confection according to claim 1 comprising from 1 to 15 wt % fat.

7. A frozen confection according to claim 1 comprising less than 0.5 wt % of stabiliser.

8. A frozen confection according to claim 1 which is an ice cream or a frozen yoghurt.

9. A frozen confection according to claim 1 which has an overrun of at least 30%.

10. A process for manufacturing a frozen confection according to claim 1, the process comprising the steps of:
 a) preparing a mix comprising water, 5 to 10 wt % of cereal meal particles having a size of from 0.1 to 1.0 mm, 5 to 25 wt % of sweeteners, and fat selected from a group consisting of coconut oil, palm oil and sunflower oil, wherein the cereal meal is maize meal, wheat meal or a mixture thereof;
 b) holding the mix at a temperature of at least 70° for at least 10 minutes;
 c) pasteurizing and optionally homogenizing the mix; then
 d) freezing the mix to produce the frozen confection.

11. A process according to claim 10 wherein the mix is aerated in step d).

* * * * *